US006722683B1

(12) United States Patent  
Heuiser

(10) Patent No.: US 6,722,683 B1  
(45) Date of Patent: Apr. 20, 2004

(54) BOAT TRAILER

(76) Inventor: Carl Heuiser, 1606 Hwy. B, Poplar Bluff, MO (US) 63901

( * ) Notice: Subject to any disclaimer, the term of this patent is extended or adjusted under 35 U.S.C. 154(b) by 38 days.

(21) Appl. No.: 10/288,802

(22) Filed: Nov. 6, 2002

(51) Int. Cl.$^7$ ................................................. B60P 3/10
(52) U.S. Cl. ................................................. 280/414.1
(58) Field of Search .......................... 280/414.1, 414.3, 280/491.1–491.4; 414/482, 483, 678

(56) References Cited

U.S. PATENT DOCUMENTS

| | | | | |
|---|---|---|---|---|
| 2,792,237 A | * | 5/1957 | Paulson | 280/414.1 |
| 3,779,573 A | * | 12/1973 | Gullberg et al. | 280/414.1 |
| 5,056,806 A | * | 10/1991 | Johnson | 280/414.1 |
| 5,228,713 A | * | 7/1993 | Kovach | 280/414.1 |
| 6,203,264 B1 | * | 3/2001 | Combs, Sr. | 280/414.1 |
| 6,446,997 B1 | * | 9/2002 | Bergman et al. | 280/414.3 |

\* cited by examiner

*Primary Examiner*—Lesley D. Morris  
*Assistant Examiner*—Matt Luby  
(74) *Attorney, Agent, or Firm*—Polster, Lieder, Woodruff & Lucchesi, L.C.

(57) ABSTRACT

An over-the-road trailer for an over-width object, such as an ocean-going speedboat, is made up of a cradle on which the object is seated, a wheeled frame, carrying the cradle, and a device for moving the cradle relative to the frame from a generally horizontal position to a position at an angle to the frame sufficient to make the effective width of the object within legal limits for over-the-road travel. The moving device includes a lifting arm mounted on a pivot pin at one end on the frame and pivotally connected at another end to the cradle. A hydraulic cylinder and piston are mounted on the frame and connected to the lifting arm. A track, mounted on the frame, has a ramp part on the side of the frame opposite the pivot pin, and a linear section tending slightly upwardly in a direction towards the pivot pin. An arm on the cradle has, at its outer end, a wheel that runs in the track and moves in a direction toward the pivot in response to the raising of the cradle by the lifting arm.

10 Claims, 4 Drawing Sheets

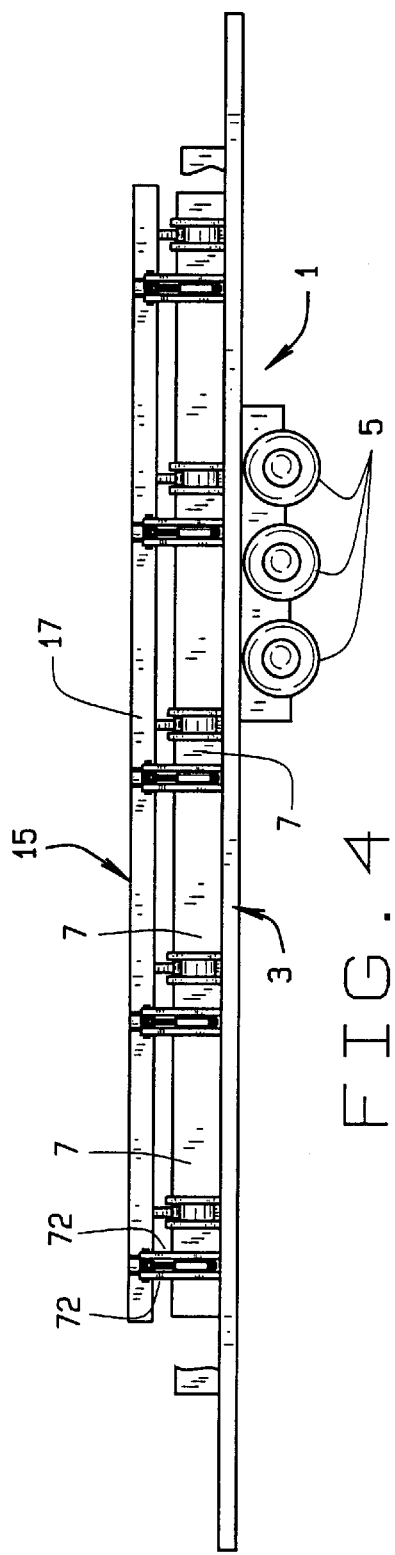
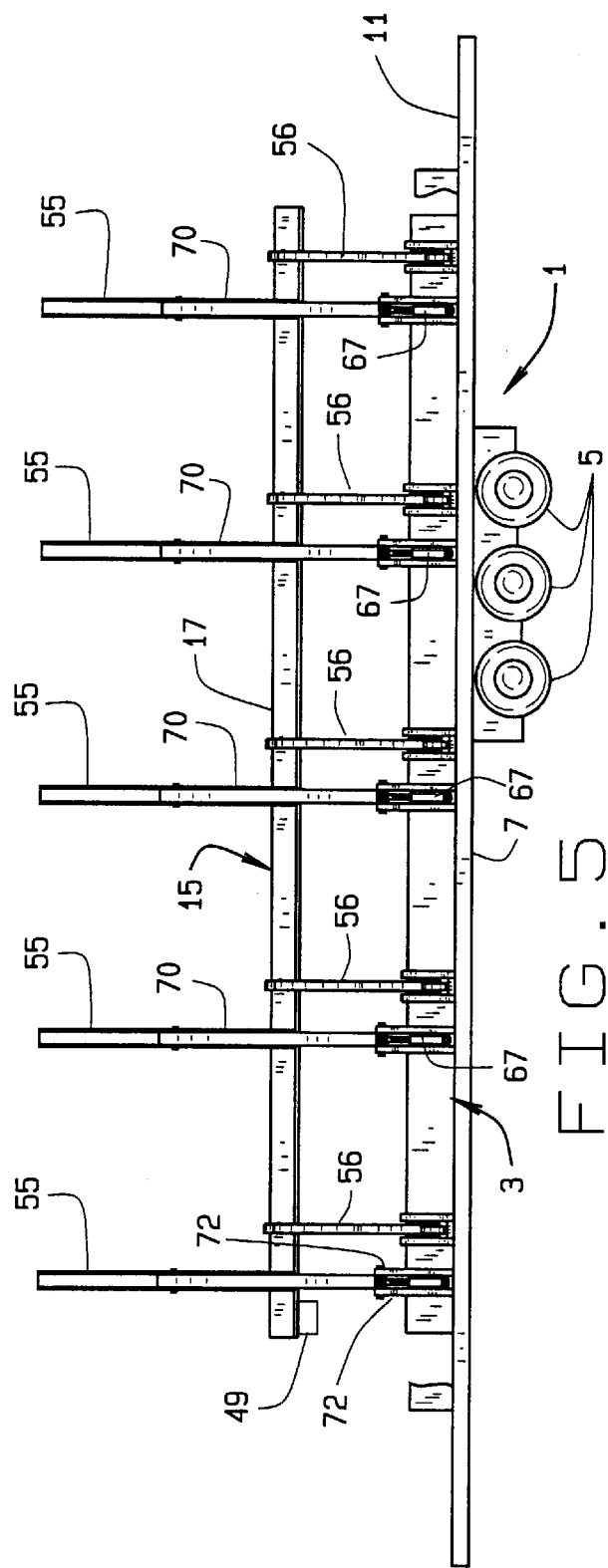

BOAT TRAILER

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

Although the use of the device of this invention is not limited thereto, it will be described as applied to the transport of tunnel hull speedboats. The trailer of this invention can be used in connection other types of boats, and with such things as pre-fabricated roof trusses and other prefab structures, or concrete forms, for example.

Tunnel hull ocean-going speed boats are on the order of ten and one half feet wide and roughly five feet high from the lower surface of the sponsons to the deck, and on the order of forty-four to fifty five feet long. The width of such a boat is greater than the allowed width of a trailer on highways in many states. Accordingly, in hauling a ten and one-half foot boat through several states, it is necessary to get special permits. It has been proposed to carry such boats on a trailer that is slanted upwardly sufficiently to make the effective width of the boat within the limits imposed by state laws. However, in these prior art trailers, the cradle on which the boat rests is permanently slanted, so that a boat being transported has to be lifted by crane or the like and put into place and removed at the other end with a similar device. It is said that a European trailer has a high deck, one side of which can be lowered, but this also requires that the boat be hoisted into position originally.

One of the objects of this invention is to provide a trailer on which a boat can be loaded so that it rides flat, for example, by being moved under the boat on land or in the water, and then tilted up to the desired angle, and unloaded by moving the boat to the level position and removing it from the trailer in a similar way.

Other objects will be apparent to those skilled in the art in the light of the following description and accompanying drawings.

BRIEF SUMMARY OF THE INVENTION

In accordance with this invention, generally stated, an over-the-road trailer for an undesirably over-width object includes a cradle on which the object is seated, a wheeled frame carrying the cradle and means for raising the cradle on one side relative to the frame from a generally horizontal position to a position at an angle to the frame sufficient to make the effective width of the object within legal limits for over the road travel. The moving means includes a lifting arm mounted at one end on a pivot to the frame and connected at another end of the arm to the cradle. Means, in the form of a hydraulic cylinder, for example, are provided for lifting the arm about the pivot. Guide and support means include a track on the frame and an arm mounted on the cradle. The arm moves in a direction toward the pivot in response to raising of the cradle by the lifting arm, and bears on the track on the frame. Preferably, a wheel is mounted on an outer end of the arm, positioned to engage and run along the track in response to raising of the cradle. Preferably also, the track includes a ramp sloping from a side of the frame downwardly in the direction toward the pivot, a section of the track adjacent the ramp being substantially linear, but tending in a small angle upwardly away from the ramp. Plates mounted parallel to and positioned at either side of the track are secured to the frame, the plates having a surface, sloping upwardly in a direction toward the pivot, to receive a projection on the arm near the wheel whereby when the cradle is moved to its upright position the wheel is raised slightly from the track by the movement of the projection along the sloping surface, to relieve the wheel of its load when the boat is tilted upright. Although the hydraulic cylinder is sufficient to hold the cradle in its uppermost position, the plates can have holes in them and the arm have a hole corresponding thereto whereby when the cradle is moved to its upright position the holes are aligned to receive a pin. Preferably, a multiplicity of lifting arms and guide and support means are spaced lengthwise of the trailer. The number of lifting arms and lifting mechanisms such as hydraulic cylinders required may vary, depending upon the load, to as few as one, but the number of guide and support means should be more than one, preferably three or more.

BRIEF DESCRIPTION OF THE SEVERAL VIEWS OF THE DRAWINGS

The objects of the invention are achieved as set forth in the illustrative embodiments shown in the drawings, which form a part of the specification.

FIG. 4 is a view in side elevation, partly fragmentary, of the device as shown in FIG. 1;

FIG. 5 is a fragmentary view in side elevation of the device of FIG. 4, in the position shown in FIG. 2;

DETAILED DESCRIPTION OF THE INVENTION

Figure 1:
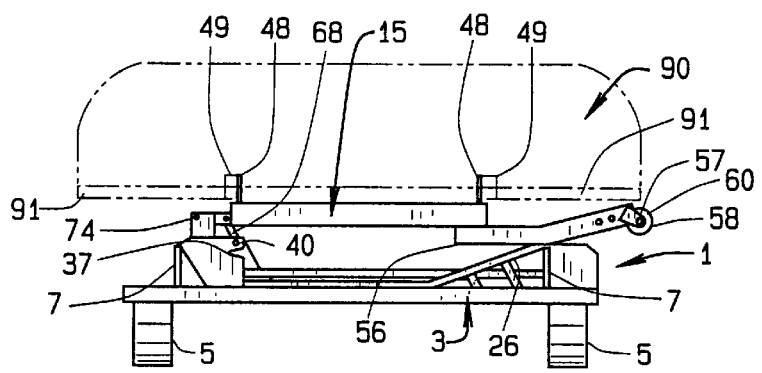
FIG. 1 is a view in end elevation of one embodiment of trailer of this invention with a cradle in its horizontal position, with a tunnel hull boat, shown in phantom lines, carried by the cradle.

Referring now to the drawings for one illustrative embodiment of this invention, reference number 1 indicates an assembled trailer of this invention with a tunnel hull speed boat shown in phantom lines, mounted on it. The boat 90 has sponsons 91 along either side of the bottom of the boat.

Figure 3:
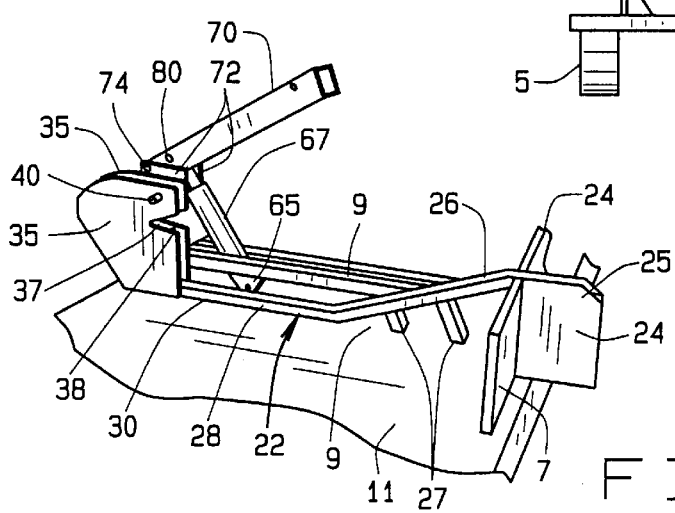
FIG. 3 is a somewhat enlarged, fragmentary view, somewhat foreshortened, of a part of a lifting mechanism and guide and support track.
Figure 8:
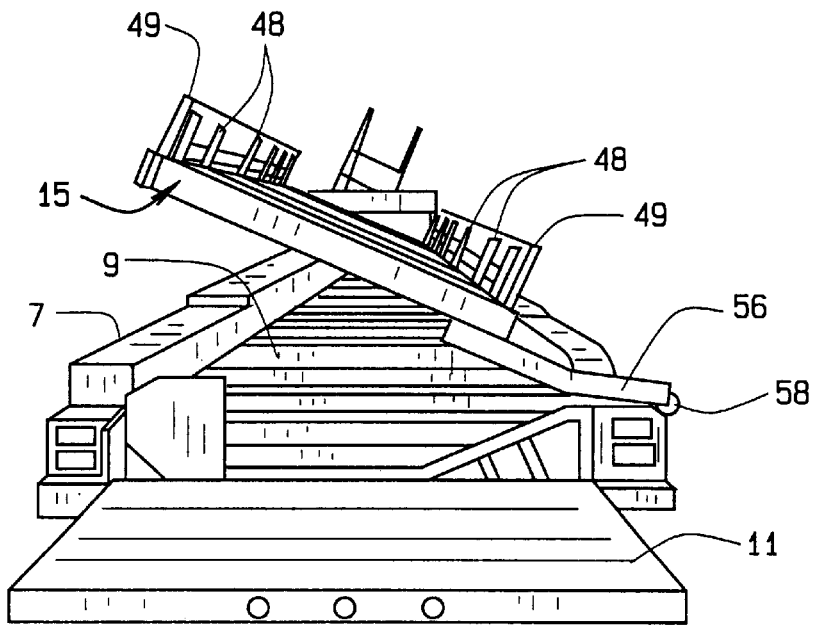
FIG. 8 is a view in end elevation showing the cradle near the beginning of its rise from the horizontal.
Figure 9:
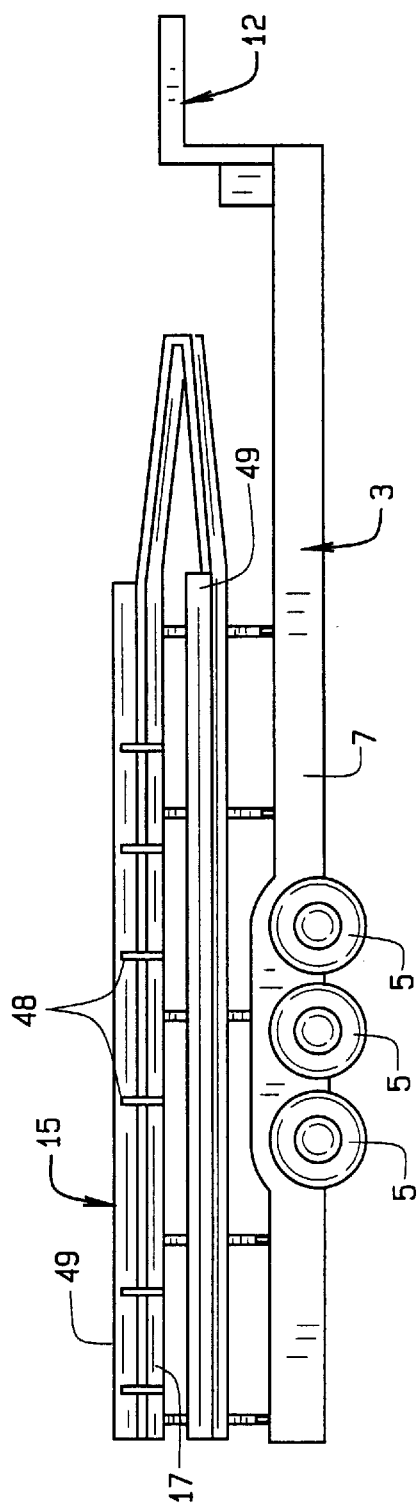
FIG. 9 is a view in side elevation of the trailer as shown in FIG. 8.
Figure 10:
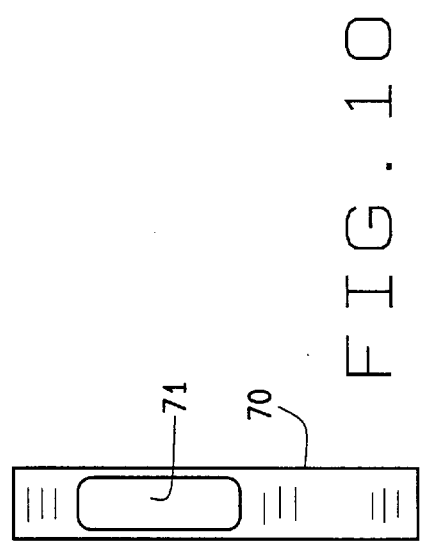
FIG. 10 is a foreshortened bottom view of a lift arm.

The trailer 1 includes a frame 3 on which wheels 5 are mounted. Beams 7 running lengthwise of the trailer on either side, are connected by transverse cross-bars in the form of box beams 9. The beams 7 are straight and parallel through the length with which the invention is concerned, curving at their forward ends to complement the curvature of the bow of the boat, and mounting a gooseneck connection 12 for a truck, as shown in FIG. 9. In the embodiment shown in FIGS. 3 and 8, an apron 11 extends from the rear of the trailer. The apron 11 is merely for the convenience of the crew, and forms no part of this invention.

Figure 2:
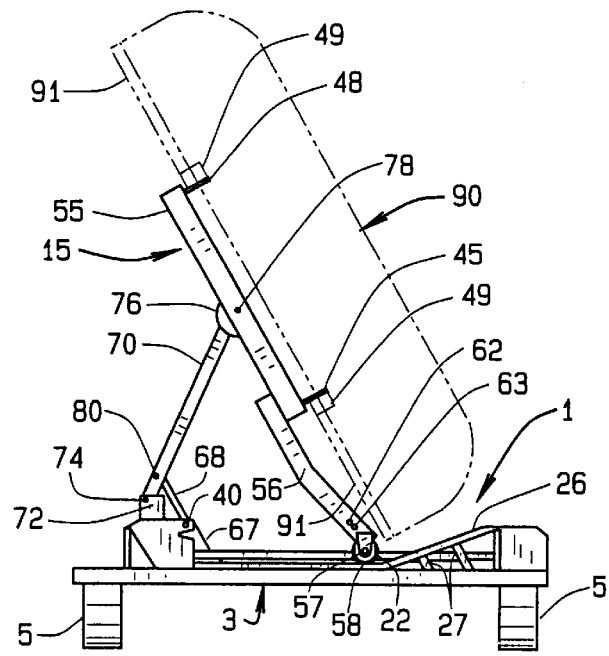
FIG. 2 is a view of the device of FIG. 1 in an intermediate position, between horizontal and fully tilted condition.

A cradle 15 carries the boat 90. The cradle 15 has longitudinal members 17 on either side and cross members 19 between and joining the longitudinal members. A series of longitudinally spaced, upwardly extending, aligned stakes 48 are welded to the longitudinal members 17, and carry on their outboard edges fenders 49, to engage sponsons 91 of the boat 90, as shown in FIGS. 1 and 2.

In the embodiment shown, five identical lift mechanisms are provided. Thus, five of the cross members 19 are in the form of bottom opening channels 55. Near the center of each channel 55, ears 76 are provided with passages to receive a pivot pin 78 which, passing through corresponding openings in a lift arm 70, pivotally connects the arm 70 to the channel 55. The lift arms are box beams. The lower end of the lift arm 70 is pivotally mounted on a pin 74 extending through lift arm plates 72 secured to the frame on either side of a pair of cross bars 9. The cross bars 9 have depending ears 65 welded to them. The ears 65 have passages to receive a pivot pin on which a hydraulic cylinder 67 is mounted. The hydraulic cylinder 67 has a piston rod 68 extending from it. The piston rod 68 extends through an opening 71 in the lift arm 70 and is pivotally mounted to the lift arm on a pin 80. The piston rod pivot pin 80 is carried by the lift arm 70, as shown FIGS. 2 and 3. The cylinder 67 is connected to a source of hydraulic fluid, not here shown.

Adjacent, but spaced longitudinally from the lift arm plates 72 are two vertical, plates 35, one on either side of one end of a track 22 extending transversely across the frame, and secured to the frame. The track is supported at one end by one of the beams 7 and through the remainder of its reach by an underlying cross beam. The track 22 has a ramp section 26 extending between a horizontal lead-in section 24, with an outboardly downwardly sloped wheel-receiving lip 25, and a linear section 28, which enters the space between the plates 35 in a slightly upwardly sloping section 30.

The vertical plates 35 have in them a V-cut 37 with a lower, upwardly outboardly sloping lower surface 38. The ramp is reinforced with braces 27. In this preferred embodiment, the track 22 is in the form of an upwardly opening channel, with side walls 32 spaced sufficiently to receive a wheel 58, mounted in a yoke 57 at the end of a dogleg arm 56 welded to a longitudinal member 17 of the cradle, as shown in FIG. 5.

Figures 6, 7:
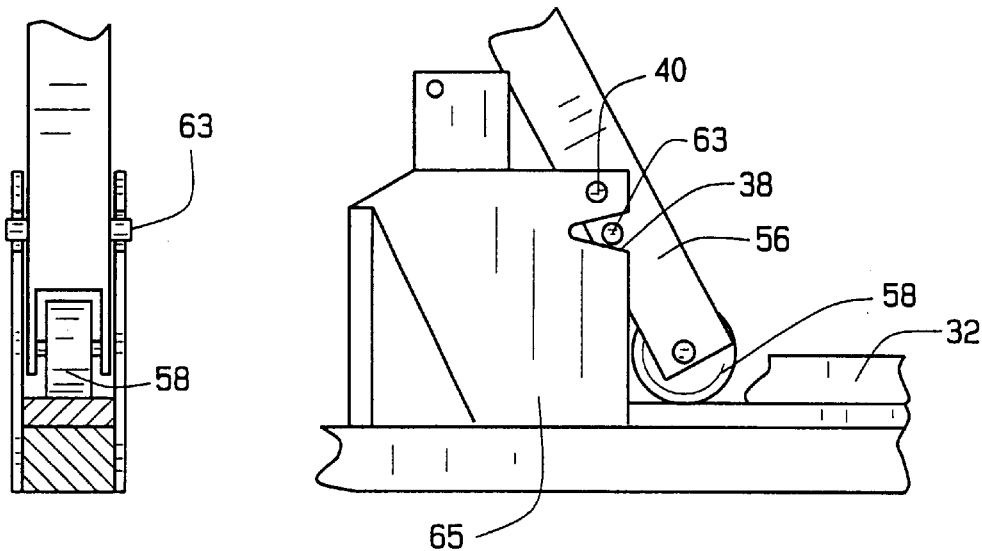
FIG. 6 is a fragmentary sectional view somewhat enlarged, showing an arm of the cradle approaching its most raised position.
FIG. 7 is a view in side elevation corresponding to the view in FIG. 6.

The arm 56 has in it near the wheel yoke 57 a pair of transversely aligned holes from which a projection in the form of a round shaft 63 extends, as shown in FIGS. 6 and 7, and transversely aligned openings 62 which, when the cradle is fully erected, are aligned with holes 40 in the plates 35, to receive a holding pin, not here shown. The holding pin is a safety device, because the cradle will be held in its upright position by the hydraulic cylinder 67. The function of the shaft 63 and surface 38 is to raise the wheel 58 slightly above track 22 to minimize wear of the wheel and its axle during transportation.

In operation, the boat 90 is mounted on the cradle 15, as by running the trailer in the water under the floating boat, for example, positioning the boat with its sponsons overhanging the fenders 49, and pulling trailer and boat out of the water. The hydraulic cylinders are then actuated, the wheels 58 being pulled over the outboard lips 24, down the ramps 26, and over the linear reaches 28 until the shaft 63 of the arm 56 rides up on the surface 38 to the inner end of the V-cut 37, to tilt the cradle to its uppermost position. The locking pin is inserted through the holes 40 in the plates 35 and the holes 62 in the arm, and the trailer, with the boat mounted on it, is ready to travel.

Numerous variations in the construction and operation of the device of this invention, within the scope of the appended claims, will occur to those skilled in the art in the light of the above disclosure. Merely by way of example, the dimensions of the various parts can be varied, and the configuration of the trailer, to accommodate either different types, sizes and shapes of boat, which can be different from the tunnel hull craft described and illustrated, for example, or the needs of a different kind of load, such as roof trusses or other prefab structures, or concrete forms, for example. A different number of raising assemblies from the five illustrated can be used, depending upon the weight and length of the load. Although the wheel is much preferred, a different kind of bearing element can be employed, as, for example, a Teflon cap riding in a Teflon coated channel, or antifriction bearings riding on the top edges of the walls of the channel or on a rail. The wheel can have flanges on either side to straddle a track, for example, or the track, without side walls, can be made a little wider, and the bearing surface of the wheel made flat as in the preferred embodiment, although the channel arrangement shown and described has a number of advantages. Provision can be made for holding the cradle in an intermediate position, if the load does not require tilting to the maximum, as by providing plates, spaced far enough apart to pass the shaft 63, with holes to receive a pin to extend through the holes 62, intermediate the ends of the reach 28 of the track 22. Although the hydraulic system is preferred because it is simple, safe and reliable, other mechanisms can be used to operate the lift arm 70, as for example, an electrically driven screw or other form of jack. In the embodiment shown, five hydraulic cylinders are used. Depending upon the load, a different number, from one, to as many as the load requires, can be used, although a plurality of guide and support means (tracks, arms and wheels) should still be employed, regardless of the number of hydraulic cylinders (or the other lifting mechanisms), to distribute the load and ensure stability. The track on which the wheel rides does not have to tend upwardly toward the receiving plates opposite the ramp, nor does there have to be a sloping surface by which the wheel is raised, although, again, the construction shown has numerous advantages. The sloping surface can be provided by a ramp not part of a V cut, and the shaft 63 may carry a sleeve or rolling bearing. The trailer can be provided with other hitches besides a gooseneck, as, for example, a fifth wheel, a Pendleton hitch or a conventional ball-type hitch. These variations are merely illustrative.

Having thus described the invention, what is claimed and desired to be secured by Letters Patent is:

1. An over-the-road trailer for an undesirably over-width object, comprising a cradle on which the object is seated, a wheeled frame carrying said cradle, and means for tilting said cradle relative to said frame from a generally horizontal position to a position at an angle to said frame sufficient to make the effective width of said object within legal limits for over-the-road travel, said tilting means comprising a lifting arm mounted on a pivot, at one end of said arm, on said frame and connected at another end to said cradle, means for moving said lifting arm about said pivot, and guide and support means, including a track on said frame and an arm mounted on said cradle, said arm moving in a direction toward said pivot in response to raising of said cradle by said lifting arm and having a member bearing on said frame track.

2. The trailer of claim 1, said guide and support means track running transversely of said frame, sloping downwardly to form a ramp at a side of said frame opposite said pivot, said arm extending parallel to said track, and said member bearing on said track comprising a wheel mounted on an outer end of said arm, positioned to engage and run along said track in response to raising of said cradle by said lifting arm.

3. The trailer of claim 2 wherein a plurality of said means for tilting and said guide and support means are spaced along the length of said frame.

4. The trailer of claim 2 wherein the track is in the form of an upwardly opening channel.

5. The trailer of claim 2 wherein a section of the track adjacent said ramp is substantially linear but tends at a small angle upwardly in a direction away from said ramp and toward the pivot, and said wheel is held above said section when the cradle is in its upwardly tilted position.

6. The trailer of claim 2 wherein the tilting means and the track are offset from one another lengthwise of said frame.

7. The trailer of claim 5 wherein at least one plate parallel to and positioned at a side of said track is secured to said frame, said plate having a surface, sloping upwardly in a direction toward said pivot, to receive a projection on said arm near said wheel, whereby, when the cradle is moved to its upright position, the wheel is raised from the track by the movement of the projection along the said sloping surface.

8. The trailer of claim 7 wherein said plate has a hole in it, and the arm has a hole corresponding to the hole in the plate, whereby, when the cradle is moved to its upright position, the holes are aligned to receive a pin.

9. The trailer of claim 7 wherein two, spaced plates are parallel to and positioned on either side of said track, said plates having transversely aligned, V-shaped openings, one surface of each of which is the said upwardly sloping surface, and said projection is in the form of a pin extending through the arm and projecting therefrom far enough to engage the said surface as the cradle is raised fully.

10. An over-the-road trailer for a tunnel-hull speed boat with sponsons along either side of its bottom, said boat being of a width greater than permitted by at least some state laws for highway travel, comprising a cradle with upwardly extending fenders on either side of said cradle, spaced to fit closely between said sponsons, on which the boat is seated, a wheeled frame carrying said cradle, and a plurality of means, spaced along said frame for tilting said cradle relative to said frame from a generally horizontal position to a position at an angle to said frame sufficient to make the effective width of the boat within legal limits for over-the-road travel, each of said tilting means comprising a lifting arm mounted on a pivot, at one end of said arm, on said frame, and pivotally connected at another end to said cradle, hydraulic means for moving said lifting arm about said pivot, and guide and support means, offset longitudinally from said tilting means, said guide and support means including a track in the form of an upwardly opening channel secured to said frame, said track running transversely of said frame, sloping downwardly to form a ramp at a side of said frame opposite said pivot, a section of the track adjacent said ramp being substantially linear but tending at a small angle upwardly in a direction away from said ramp and toward the pivot, and an arm fixedly mounted on said cradle, said arm extending parallel to said track and moving in a direction toward said pivot in response to raising of said cradle by said lifting arm, a wheel mounted on an outboard end of said arm, said wheel being positioned to engage and run along said track in response to raising of said cradle by said lifting arm, a projection in the form of a shaft projecting from opposite sides of said arm adapted to engage an upwardly sloping surface to raise the wheel from the track when the cradle is in its uppermost position, two, spaced plates, parallel to and positioned on either side of said track, said plates having transversely aligned, V-shaped openings, one surface of each of which is the said upwardly sloping surface to be engaged by said projecting shaft as the cradle is raised fully so that when the cradle is moved to its upright position, the wheel is raised from the track by the movement of the projection along the said sloping surface, said plates also having transversely aligned holes in them, and the arm having a hole to the holes in the plates, whereby, when the cradle is moved to its upright position, the holes are aligned to receive a pin.

* * * * *

UNITED STATES PATENT AND TRADEMARK OFFICE
CERTIFICATE OF CORRECTION

PATENT NO. : 6,722,683 B1  
DATED : April 20, 2004  
INVENTOR(S) : Carl Heuiser

It is certified that error appears in the above-identified patent and that said Letters Patent is hereby corrected as shown below:

Column 4,
Line 42, replace "or the other" with -- or other --

Column 6,
Line 39, replace "hole to" with -- hole corresponding to --

Signed and Sealed this

Twenty-ninth Day of June, 2004

JON W. DUDAS
*Acting Director of the United States Patent and Trademark Office*